US012561950B2

(12) United States Patent
Merler et al.

(10) Patent No.: US 12,561,950 B2
(45) Date of Patent: Feb. 24, 2026

(54) AI SYSTEM AND METHOD FOR AUTOMATIC ANALOG GAUGE READING

(71) Applicant: International Business Machines Corporation, Armonk, NY (US)

(72) Inventors: Michele Merler, New York City, NY (US); Dhiraj Joshi, Edison, NJ (US); Apurv Gupta, Vadodara (IN); Sebastien Gilbert, Granby (CA); Shyama Prosad Chowdhury, West Bengal (IN); Chidansh Amitkumar Bhatt, Hightstown, NJ (US); Nirmit V. Desai, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 17/936,519

(22) Filed: Sep. 29, 2022

(65) Prior Publication Data

US 2024/0112444 A1     Apr. 4, 2024

(51) Int. Cl.
| | |
|---|---|
| *G06V 10/00* | (2022.01) |
| *G06V 10/22* | (2022.01) |
| *G06V 10/74* | (2022.01) |
| *G06V 10/764* | (2022.01) |

(Continued)

(52) U.S. Cl.
CPC ............ *G06V 10/764* (2022.01); *G06V 10/23* (2022.01); *G06V 10/761* (2022.01); *G06V 10/85* (2022.01); *G06V 30/19173* (2022.01); *G06V 2201/07* (2022.01)

(58) Field of Classification Search
CPC ........... G06N 3/02; G06N 3/08; G06N 3/042; G06N 3/045; G06N 3/047; G06N 3/082; G06N 3/088; G06N 3/092; G06N 3/0454; G06N 3/0475; G06N 3/0464; G06V 10/82; G06V 10/761; G06V 10/762; G06V 10/764; G06V 10/765; G06V 10/7715; G06V 10/25; G06V 10/85; G06V 30/10; G06V 30/19173; G06V 2201/07; G06V 2201/02
See application file for complete search history.

(56) References Cited

U.S. PATENT DOCUMENTS

| | | | |
|---|---|---|---|
| 10,346,707 B2 | 7/2019 | Melugin et al. | |
| 10,559,078 B2 * | 2/2020 | Hu | G06T 7/001 |
| 10,679,069 B2 * | 6/2020 | Trim | G06V 10/82 |

(Continued)

OTHER PUBLICATIONS

Howells et al., "Real-time analogue gauge transcription on mobile phone," CVPR 2021, Workshops, Virtual Conference, Jun. 19-25, 2021, 9 pages.

(Continued)

*Primary Examiner* — Amir Alavi
(74) *Attorney, Agent, or Firm* — Yee & Associates, P.C.

(57) ABSTRACT

Automated analog gauge reading is provided. The method comprises a computer system receiving input of an image and detecting at least one analog gauge in the image. The computer system corrects the orientation of the analog gauge in the image and detects scene text and tick labels on the analog gauge. The computer system determines a position of a pointer on the analog gauge relative to the scene text and outputs a gauge reading value based on an arithmetic progression of tick labels and angle of the pointer with respect to minimum and maximum values on the analog gauge.

20 Claims, 10 Drawing Sheets

(51) Int. Cl.
    *G06V 10/84* (2022.01)
    *G06V 30/19* (2022.01)

(56) References Cited

U.S. PATENT DOCUMENTS

| | | | |
|---|---|---|---|
| 10,956,796 B2 * | 3/2021 | Yan ..................... | G06V 30/248 |
| 10,970,584 B2 | 4/2021 | Petruk | |
| 11,145,130 B2 | 10/2021 | Maggiore et al. | |
| 11,176,369 B2 | 11/2021 | Narahari | |
| 11,354,936 B1 * | 6/2022 | Chandarana ......... | G06V 40/172 |
| 11,450,111 B2 * | 9/2022 | Rotman ................ | G06V 10/82 |
| 11,544,509 B2 * | 1/2023 | Arroyo ............... | G06V 10/761 |
| 12,249,168 B2 * | 3/2025 | Azulai ............ | G06V 30/19173 |
| 12,272,122 B1 * | 4/2025 | Matcovici ........... | G06V 10/764 |
| 12,277,786 B2 * | 4/2025 | Arroyo ................. | G06V 20/62 |
| 12,406,022 B2 * | 9/2025 | Kobayashi ........... | G06F 18/214 |
| 2021/0142102 A1 | 5/2021 | Al Rashdan et al. | |
| 2024/0112444 A1 * | 4/2024 | Merler .................. | G06V 10/23 |
| 2025/0299481 A1 * | 9/2025 | Albert ................. | G06V 10/945 |

OTHER PUBLICATIONS

Yang et al., "It's About Time: Analog Clock Reading in the Wild," ArXiv, Dec. 6, 2021, 16 pages.

Chavan et al., "High Precision Analog Gauge Reader Using Optical Flow and Computer Vision," 2022 IEEE International Conference on Electro Information Technology (eIT), May 19-21, 2022, Mankato, Minnesota, 5 pages. http://ecasp.ece.iit.edu/publications/2012-present/2022-03.pdf.

Anonymous, "Recommending Items for Deletion based on Item Quality and Usage," An IP.com Prior Art Database Technical Disclosure, IPCOM000252293D, Jan. 3, 2018, 38 pages.

Anonymous, "Apparatus and Methods for Building Inspection Augmented with AI," An IP.com Prior Art Database Technical Disclosure, IPCOM000264986D, Feb. 15, 2021, 6 pages.

Anonymous, "A Method to Improve the Recognition of Persons in Photos Using Metadata," An IP.com Prior Art Database Technical Disclosure, IPCOM0002672710, Oct. 12, 2021, 5 pages.

Lauridsen et al., "Reading Circular Analogue Gauges using Digital Image Processing," 14th International Joint Conference on Computer Vision, Imaging and Computer Graphics Theory and Applications (VISIGRAPP 2019), Prague, Czech Republic, Feb. 25-27, 2019, pp. 373-382.

Chi et al., "Machine Vision Based Automatic Detection Method of Indicating Values of a Pointer Gauge, "Mathematical Problems in Engineering, vol. 2015, Article ID 283629, published Oct. 4, 2015, 20 pages.

Lee et al., "Automatic Reading Analog gauge with Handheld device," 2020 IEEE International Conference on Consumer Electronics (ICCE), Las Vegas, Nevada, Jan. 4-6, 2020, 3 pages.

Li et al., "Analog Gauge Reader based on Image Recognition," 2020 International Conference on Applied Physics and Computing (ICAPC 2020), London, United Kingdom, Aug. 20-21, 2020, Journal of Physics: Conference Series, 1650, 9 pages.

"Developer Zone", Intel, Aug. 2022, 4 pages, doi: https://www.intel.com/content/www/US/en/developer/overview. html.

"LEVATAS website", LEVATAS, Jul. 2022, 6 pages, doi: https://levatas.com/.

"Lilz Gauge", LiLz Inc., Aug. 2022, 8 pages, doi: https://lilzgauge.com/.

X. Yang et al., "Machine Learning in Practice: Using Artificial Intelligence to Read Analog Gauges", Object Computing Technology that empowers, Jun. 2019, 15 pages, doi: https://objectcomputing.com/resources/publications/sett/june-2019-using-machine-learning-to-read-analog-gauges.

\* cited by examiner

COMPUTING ENVIRONMENT
100

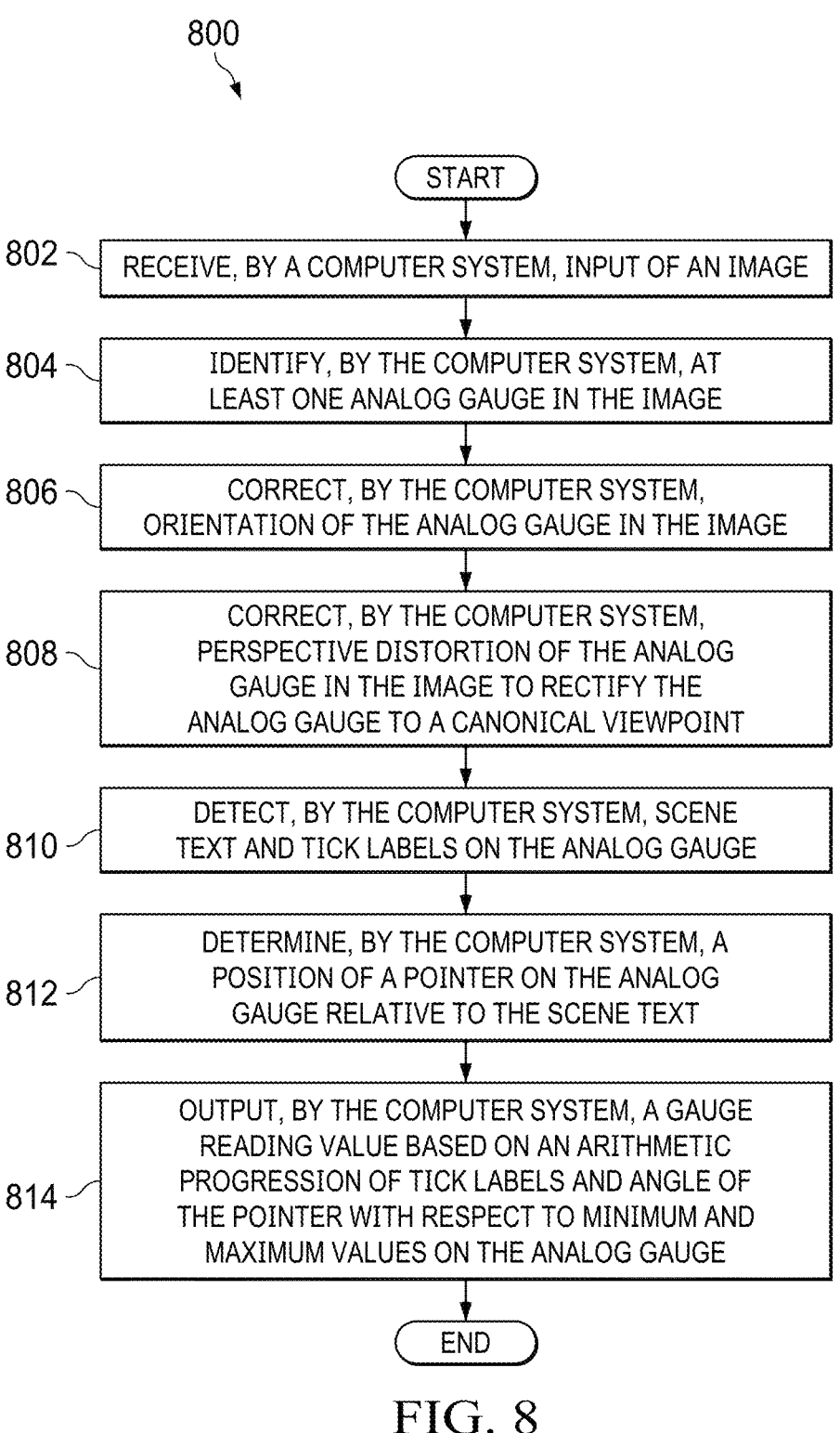

800

START

802 — RECEIVE, BY A COMPUTER SYSTEM, INPUT OF AN IMAGE

804 — IDENTIFY, BY THE COMPUTER SYSTEM, AT LEAST ONE ANALOG GAUGE IN THE IMAGE

806 — CORRECT, BY THE COMPUTER SYSTEM, ORIENTATION OF THE ANALOG GAUGE IN THE IMAGE

808 — CORRECT, BY THE COMPUTER SYSTEM, PERSPECTIVE DISTORTION OF THE ANALOG GAUGE IN THE IMAGE TO RECTIFY THE ANALOG GAUGE TO A CANONICAL VIEWPOINT

810 — DETECT, BY THE COMPUTER SYSTEM, SCENE TEXT AND TICK LABELS ON THE ANALOG GAUGE

812 — DETERMINE, BY THE COMPUTER SYSTEM, A POSITION OF A POINTER ON THE ANALOG GAUGE RELATIVE TO THE SCENE TEXT

814 — OUTPUT, BY THE COMPUTER SYSTEM, A GAUGE READING VALUE BASED ON AN ARITHMETIC PROGRESSION OF TICK LABELS AND ANGLE OF THE POINTER WITH RESPECT TO MINIMUM AND MAXIMUM VALUES ON THE ANALOG GAUGE

END

FIG. 8

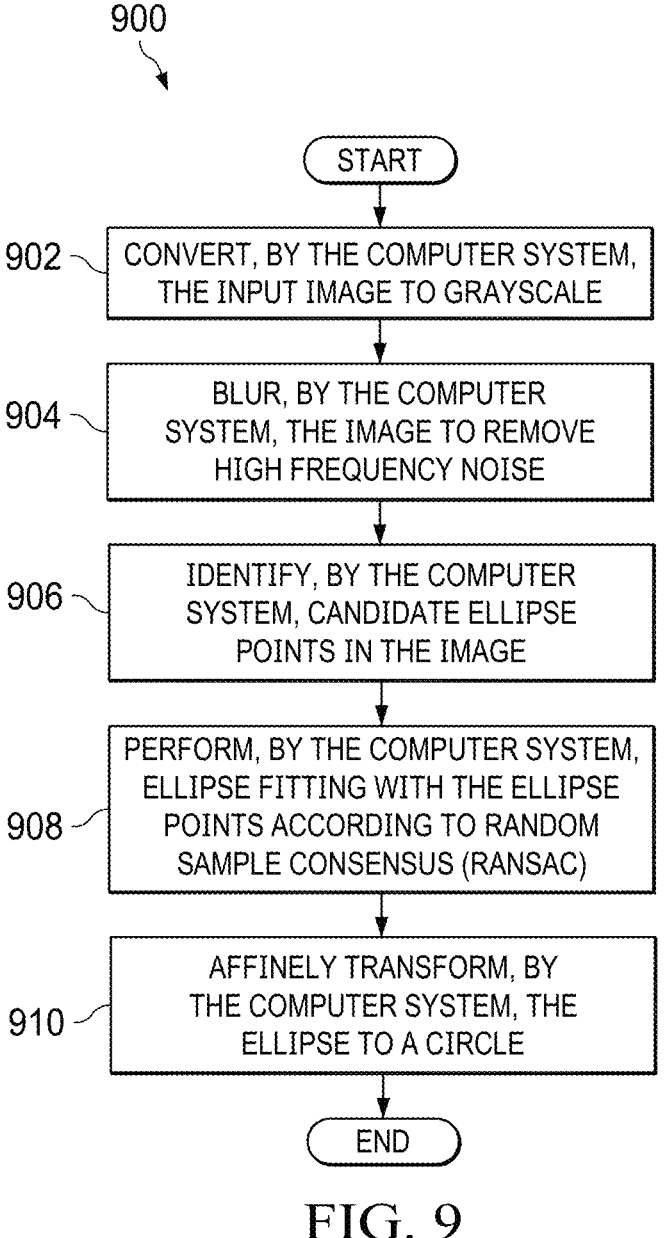

900

START

902 — CONVERT, BY THE COMPUTER SYSTEM, THE INPUT IMAGE TO GRAYSCALE

904 — BLUR, BY THE COMPUTER SYSTEM, THE IMAGE TO REMOVE HIGH FREQUENCY NOISE

906 — IDENTIFY, BY THE COMPUTER SYSTEM, CANDIDATE ELLIPSE POINTS IN THE IMAGE

908 — PERFORM, BY THE COMPUTER SYSTEM, ELLIPSE FITTING WITH THE ELLIPSE POINTS ACCORDING TO RANDOM SAMPLE CONSENSUS (RANSAC)

910 — AFFINELY TRANSFORM, BY THE COMPUTER SYSTEM, THE ELLIPSE TO A CIRCLE

END

FIG. 9

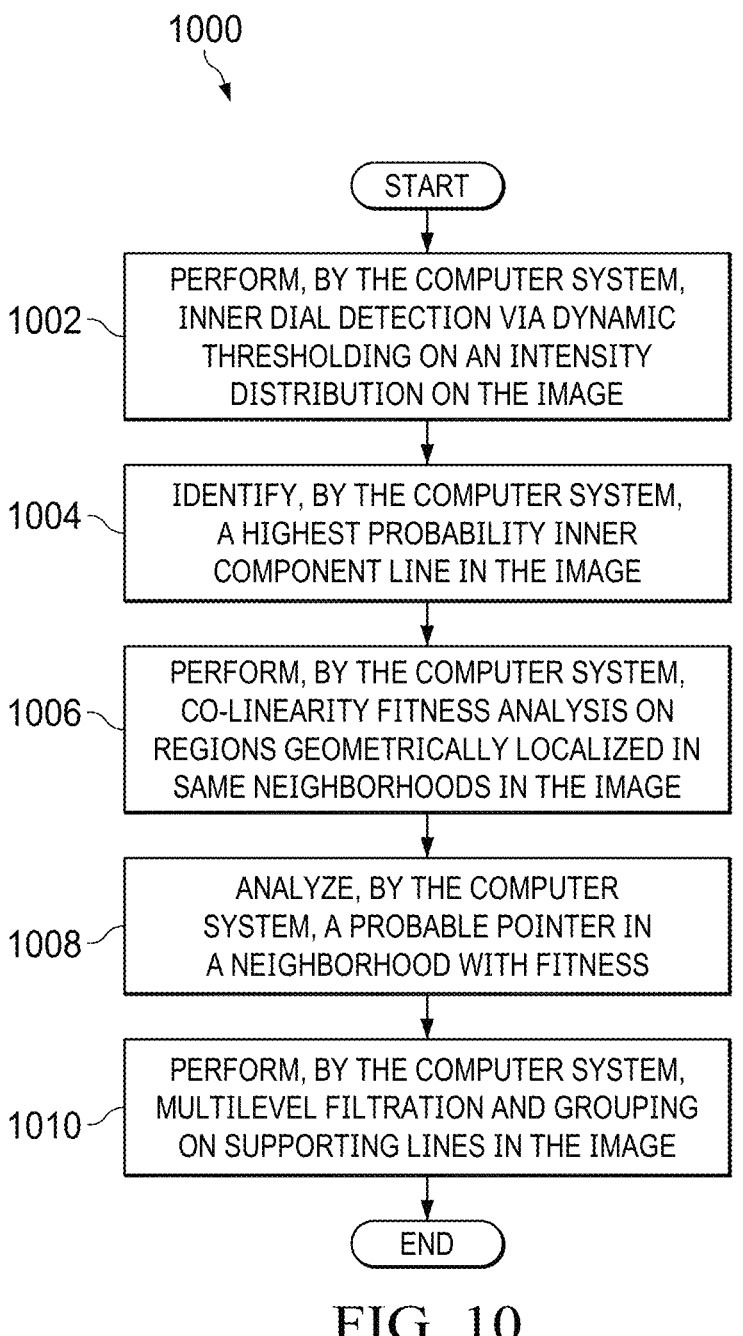

1000

START

1002 — PERFORM, BY THE COMPUTER SYSTEM, INNER DIAL DETECTION VIA DYNAMIC THRESHOLDING ON AN INTENSITY DISTRIBUTION ON THE IMAGE

1004 — IDENTIFY, BY THE COMPUTER SYSTEM, A HIGHEST PROBABILITY INNER COMPONENT LINE IN THE IMAGE

1006 — PERFORM, BY THE COMPUTER SYSTEM, CO-LINEARITY FITNESS ANALYSIS ON REGIONS GEOMETRICALLY LOCALIZED IN SAME NEIGHBORHOODS IN THE IMAGE

1008 — ANALYZE, BY THE COMPUTER SYSTEM, A PROBABLE POINTER IN A NEIGHBORHOOD WITH FITNESS

1010 — PERFORM, BY THE COMPUTER SYSTEM, MULTILEVEL FILTRATION AND GROUPING ON SUPPORTING LINES IN THE IMAGE

END

FIG. 10

AI SYSTEM AND METHOD FOR AUTOMATIC ANALOG GAUGE READING

BACKGROUND

1. Field

The present disclosure relates generally to an improved computing system, and more specifically to a method for automatic image recognition and reading of analog gauges.

2. Background

Reading analog gauges is a necessary operation for many industries that retain instrumentation of legacy systems across multiple sites that are prohibitively expensive to replace. Gauges may need to be checked on a recurring basis to ensure no abnormalities are occurring as well as ensure proper operations.

Therefore, it would be desirable to have a method and apparatus that take into account at least some of the issues discussed above, as well as other possible issues.

SUMMARY

An illustrative embodiment provides a computer-implemented method of automated analog gauge reading. The method comprises a computer system receiving input of an image and detecting at least one analog gauge in the image. The computer system corrects the orientation of the analog gauge in the image and detects scene text and tick labels on the analog gauge. The computer system determines a position of a pointer on the analog gauge relative to the scene text and outputs a gauge reading value based on an arithmetic progression of tick labels and angle of the pointer with respect to minimum and maximum values on the analog gauge. According to other illustrative embodiments, a computer system, and a computer program product for automated analog gauge reading are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 depicts a flowchart of a process for automated analog gauge reading in accordance with an illustrative embodiment;

FIG. 9 depicts a flowchart of a process for correcting perspective distortion in accordance with an illustrative embodiment; and FIG. 10 depicts a flowchart of a process for determining the position of the pointer on the analog gauge in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
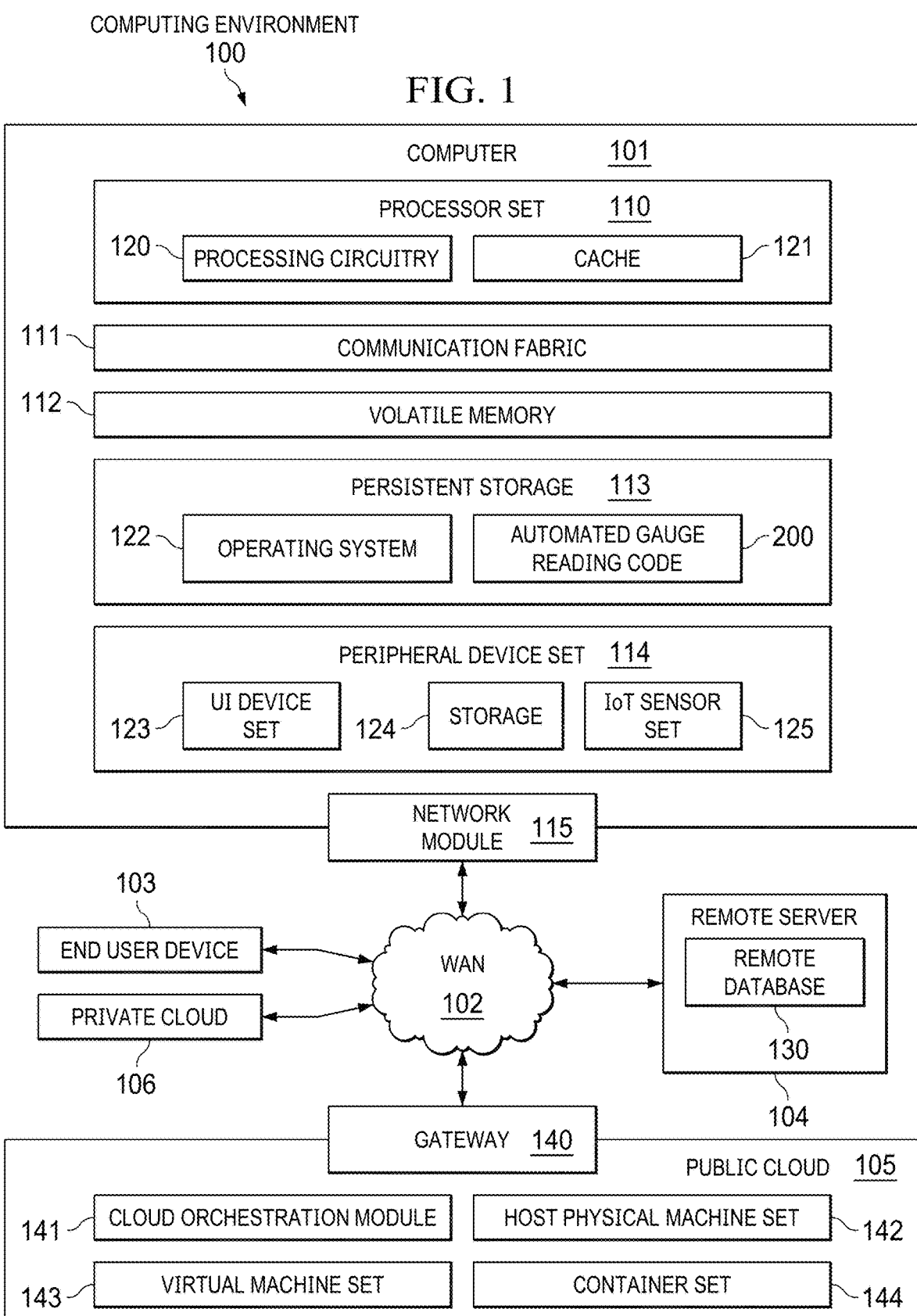
FIG. 1 depicts a pictorial representation of a computing environment in which illustrative embodiments may be implemented.
Figure 2:
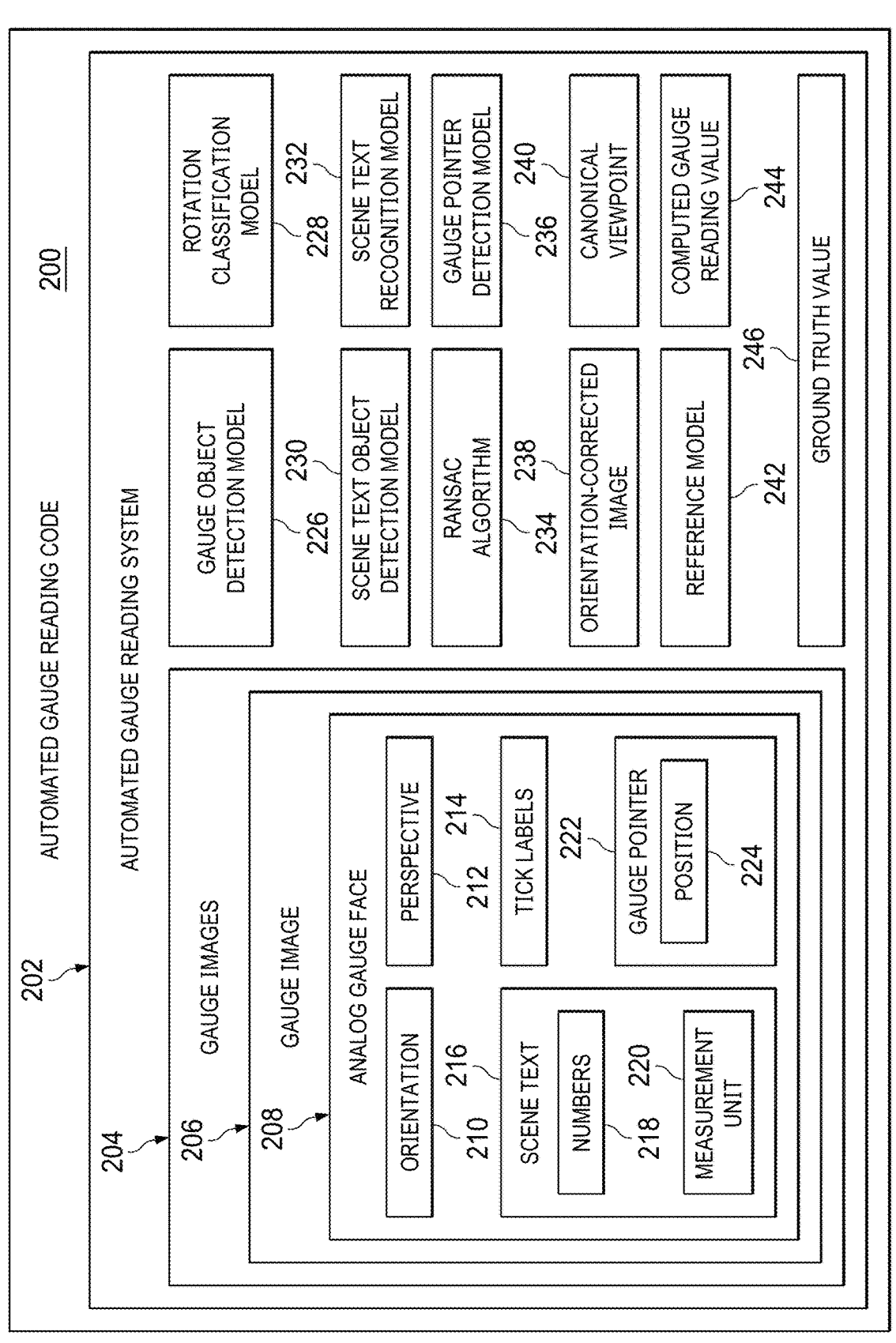
FIG. 2 depicts a pictorial representation of automatic gauge reading system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 depicts a pictorial representation of a computing environment in which illustrative embodiments may be implemented. Computing environment 100 contains an example of an environment for the execution of at least some of the computer code involved in performing the inventive methods, such as automated gauge reading code 200. In addition to automated gauge reading code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and automated gauge reading code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in automated gauge reading code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Automated gauge reading code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile.

In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer

101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that reading analog gauges is a tedious yet necessary operation for many industries that retain instrumentation of legacy systems across multiple sites that are prohibitively expensive to replace. The illustrative embodiments recognize and take into account that gauges need to be checked on a recurring basis (e.g., daily) to ensure no abnormalities are occurring as well as ensure proper operation (e.g., flare stack).

The illustrative embodiments recognize and take into account that wiring analog gauges to distributed control systems (DCS) can be expensive is typically only warranted when 24/7 real-time readings are critical to plant operations and safety.

The illustrative embodiments recognize and take into account that manual inspection is costly, time consuming, and potentially dangerous due to exposure to gas leaks, high voltage, and difficult terrain proximate to the gauges.

The illustrative embodiments provide a fully automated system for reading analog gauges from a captured image. The illustrative embodiments combine a novel framework of deep learning including gauge image detection, rotation estimate, and optical character recognition and computer vision approaches.

The illustrative embodiments provide the technical improvement of fully automated analog gauge reading without human input.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A macro (short for macro instruction) is a programmable pattern that translates a sequence of inputs to a preset sequence of outputs. A macro provides a single program statement in place of a sequence of computing instructions. In an illustrative embodiment, the preprocessor is configured to generate information records that direct the debugger to set one or more breakpoints at selected computer instructions enclosed by the macros ("macro enclosed" codes or records). Breakpoints can be used to cause a debugger to pause at the code line indicated by a breakpoint. At this point, validated parts of code can be run while pausing execution of the macro in areas that need further testing.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

FIG. 2 depicts a pictorial representation of automatic gauge reading system in accordance with an illustrative embodiment. Automated gauge reading system 202 may be implemented with automated gauge reading code 200 in computing environment 100 shown in FIG. 1.

Automated gauge reading system 202 receives a number of gauge images 204, which may be still images or videos captured by an imaging device such as a static camera, mobile camera, drone, robot. Such imaging devices might operate as network devices within IoT sensor set 125 in computing environment 100. Each gauge image 206 comprises an analog gauge face 208. Gauge face 208 has an orientation 210 in space and a perspective 212 relative to the image device that captures the gauge image 206. The analog gauge face 208 includes tick labels 214 spaced at regular intervals around the analog gauge face 208. Analog gauge face 208 also comprises scene text 216 may include numbers 218 and a measurement unit indication 220 that specifies the physical property quantified by numbers 218. Typically, numbers 218 are aligned with a subset of corresponding tick labels 214 (e.g., every 10 units). Analog gauge face 208 also comprises a gauge pointer 222 which has a position 224 relative to the tick labels 214 and numbers 218 that indicates the gauge reading.

Automated gauge reading system 202 may employ a gauge object recognition model 226 trained to identify and localize gauges present within gauge images 204. Gauge object recognition model 226 may comprise a deep learning model such as, for example, a Faster Region-based Convolutional Neural Network (R-CNN), Masked-RCNN, Single-Shot Detector (SSD) model, You Only Look Once (YOLO), or a machine learning model used in conjunction with visual features such as, for example, a histogram of oriented gradients (HOG).

A rotation classification model 228 may be trained to recognize the orientation of the gauges identified in gauge images 204 to generate an orientation-corrected image 238. Rotation class classification model 228 may comprise a machine learning model that such as a CNN, Transformer, Support Vector Machine (SVM), Boosting, etc., that estimates one of a possible finite set of positions/orientations. Rotation class classification model 228 may also comprise a machine learning regression model that estimates any angle in the range 0-360°.

Scene text object detection model 230 is used to detect and localize scene text 216 including numbers 218 on the analog gauge face 208. Scene text object detection model 230 may comprise a deep learning model such as, for example, a Faster R-CNN, Masked-RCNN, SSD model, YOLO, or a machine learning model used in conjunction with visual features such as, for example, HOG.

A separate scene text recognition model 232 such as optical character recognition (OCR) may be used to recognize and identify the specific scene text 216 on the analog gauge face 208. Alternatively, scene text object detection model 230 and scene text recognition model 232 may be integrated into a single machine learning model.

A random sample consensus (RANSAC) algorithm 234 may be used in conjunction with local keypoints detection on the tick labels 214 and a reference model 242 of a circular set of points to correct the perspective of the gauge images 204 to generate canonical viewpoint 240.

A gauge pointer detection model 236 is used to detect the gauge pointer 222 and determine its position 224. Gauge pointer detection model 236 may comprise a deep learning model such as, for example, a Faster R-CNN, Masked-RCNN, SSD model, YOLO, or a machine learning model used in conjunction with visual features such as, for example, HOG. Gauge pointer detection model 236 may employ computer vision techniques such as edge detection and line fitting.

Automated gauge reading system 202 generates a computed gauge reading value 244 which may be displayed in a user interface that is displayed by UI device set 123 in computing environment 100. The computed gauge reading value 244 may also be stored in a database such as database 130. During training, this computed gauge reading value 244 may be compared to a ground truth reading 246 obtained manually.

Figure 3:
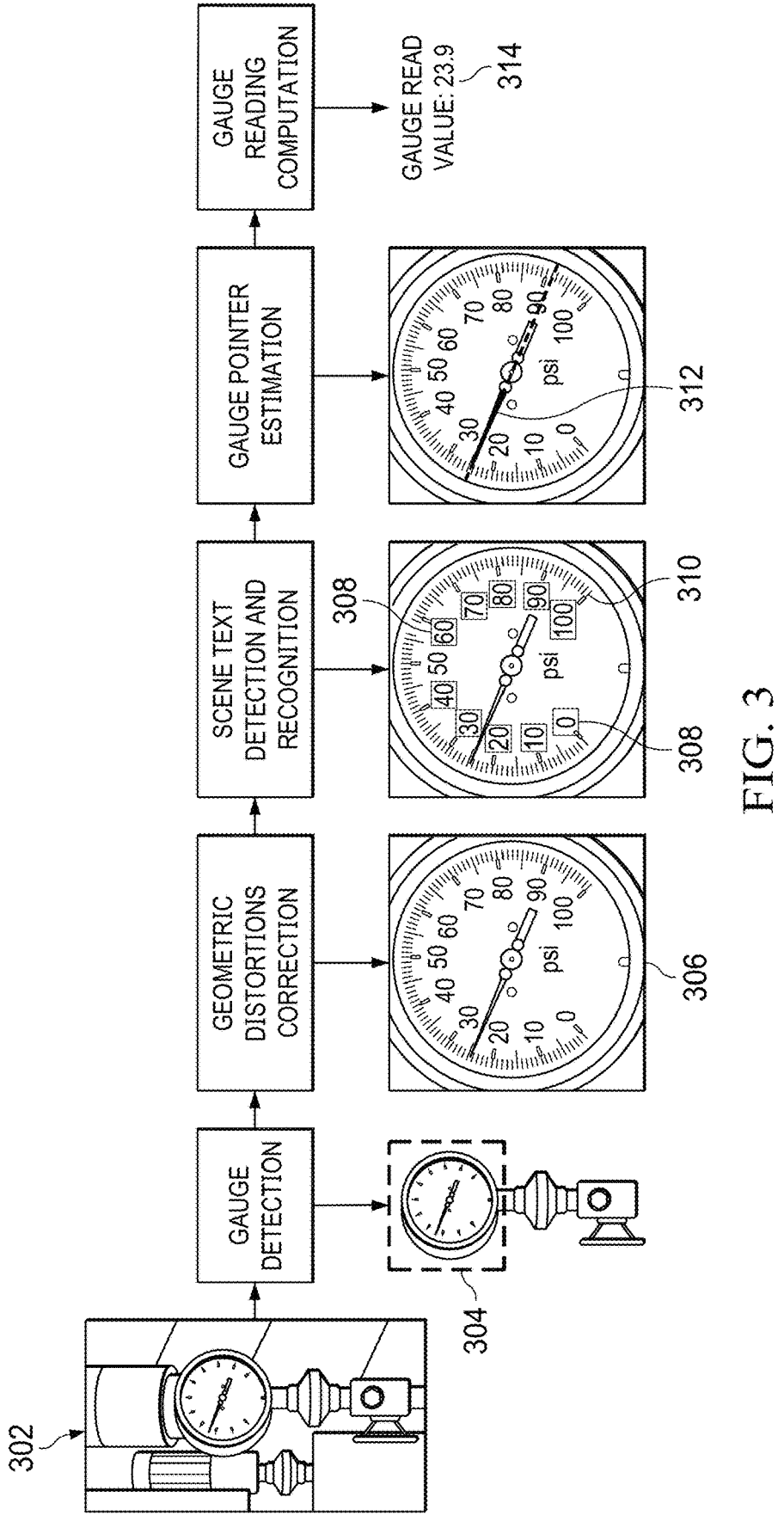
FIG. 3 depicts a pictorial representation of the operation of an automated gauge reading system in accordance with an illustrative embodiment.

FIG. 3 depicts a pictorial representation of the operation of an automated gauge reading system such as automated gauge reading system 200 in accordance with an illustrative embodiment.

The system initially receives an input image 302 and then identifies a gauge 304 in the image. Geometric distortions such as orientation and perspective are corrected to produce an upright canonical image 306 of the gauge.

Scene text recognition allows the system to detect and identify numbers 308 and tick labels 310 on the face of the analog gauge. The system can then estimate the position of the gauge pointer 312 on the gauge face relative to the numbers and tick labels to compute a gauge read value 314. The system computes the intersection between the detected pointer line 312 and the curve fitted through the numbers 308 and tick labels 310 detected on the gauge dial face. The gauge reading may be computed based on the arithmetic progression of values estimated for such a point within the sequence of recognized number 308 on the dial.

Figure 4:
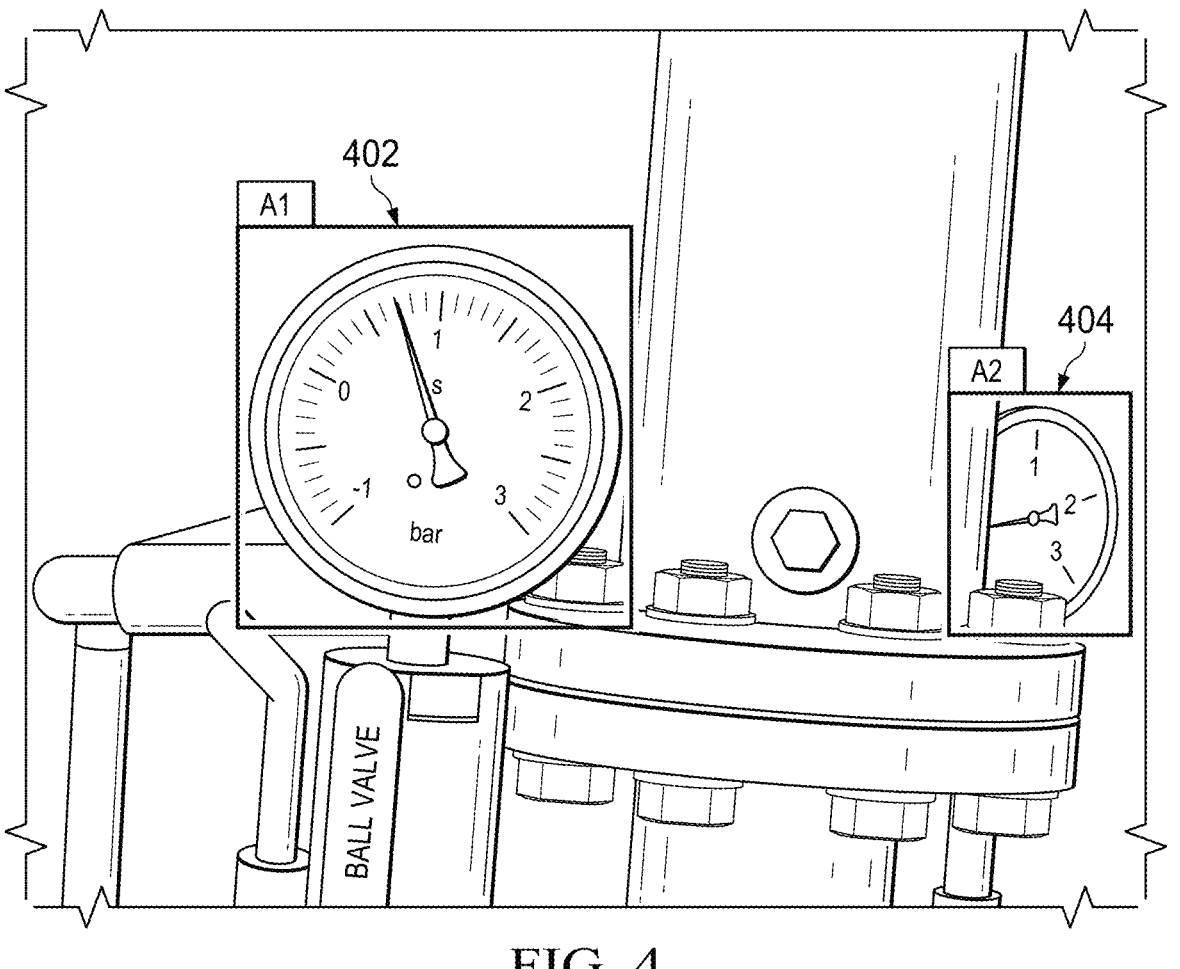
FIG. 4 depicts a pictorial representation of detection of multiple gauges in accordance with an illustrative embodiment.

FIG. 4 depicts a pictorial representation of detection of multiple gauges in accordance with an illustrative embodiment. In it not uncommon for industrial equipment to have multiple analog gauges in close proximity to each other which may be captured in a single image. The present example, the gauge reading system has detected and identified two analog gauges 402 and 404. Due to differences in visual perspectives, the images of gauges 402 and 404 require different amounts of geometric distortion correction. However, the ability to perform such geometric distortion correction allows the illustrative embodiments to process and read multiple gauges in parallel with a single image capture, thereby reducing data collection time and resource requirements.

Figure 5:
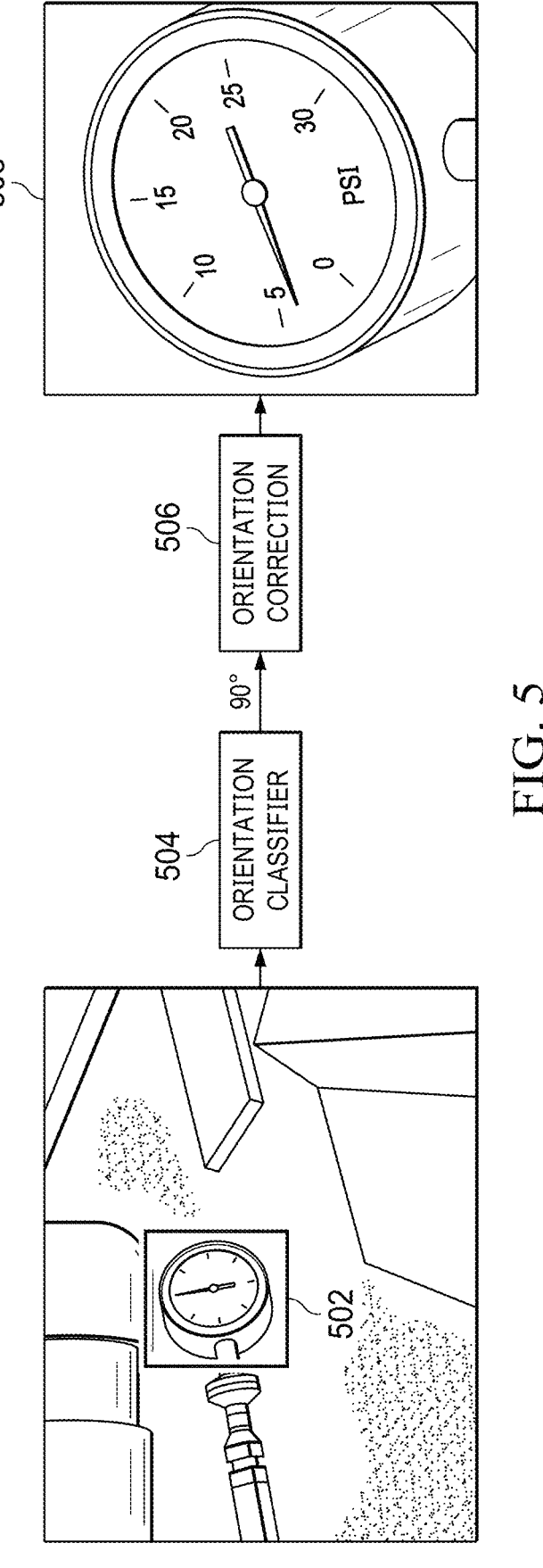
FIG. 5 depicts a pictorial representation of orientation correction in accordance with an illustrative embodiment.

FIG. 5 depicts a pictorial representation of orientation correction in accordance with an illustrative embodiment. In the present example, the gauge reading system receives an image 502 of an analog gauge that is rotated 90° from upright. This image is fed into an orientation classification model 504 that is trained to recognize a set of gauge rotations from 0° to 360°. This orientation classification model 504 may be implemented using, for example, a Pytorch MobileNet model. The orientation classification value (i.e., 90° from upright) is fed into an orientation correction model 506 which generates a corrected upright image 508 reoriented 90°.

Figure 6:
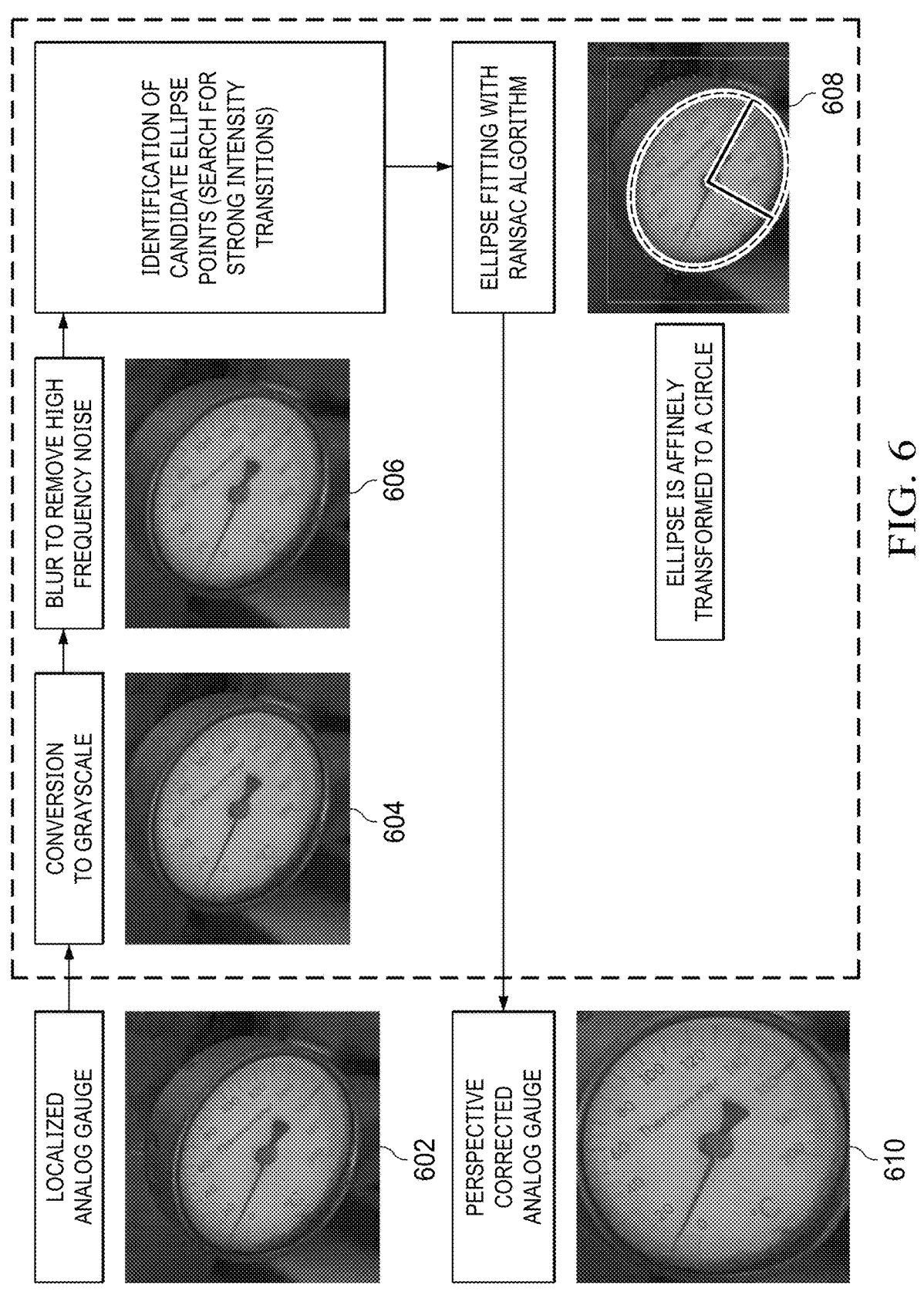
FIG. 6 depicts a pictorial representation of perspective distortion correction in accordance with an illustrative embodiment.

FIG. 6 depicts a pictorial representation of perspective distortion correction in accordance with an illustrative embodiment. This process is also illustrated in the flowchart in FIG. 9.

The system begins with input of a localized image 602 of an analog gauge and converts the image to a grayscale image 604. The grayscale image is then blurred 606 to remove high frequency noise. The system identifies candidate ellipse points from the blurred image 606 by searching for strong intensity transitions.

The system then performs ellipse fitting 608 using a RANSAC algorithm such as RANCSAC algorithm 230 in FIG. 2, and the ellipse is affinely transformed to a circle. After the affine transformation, the system generates a perspective corrected image 610 of the analog gauge.

Figure 7:
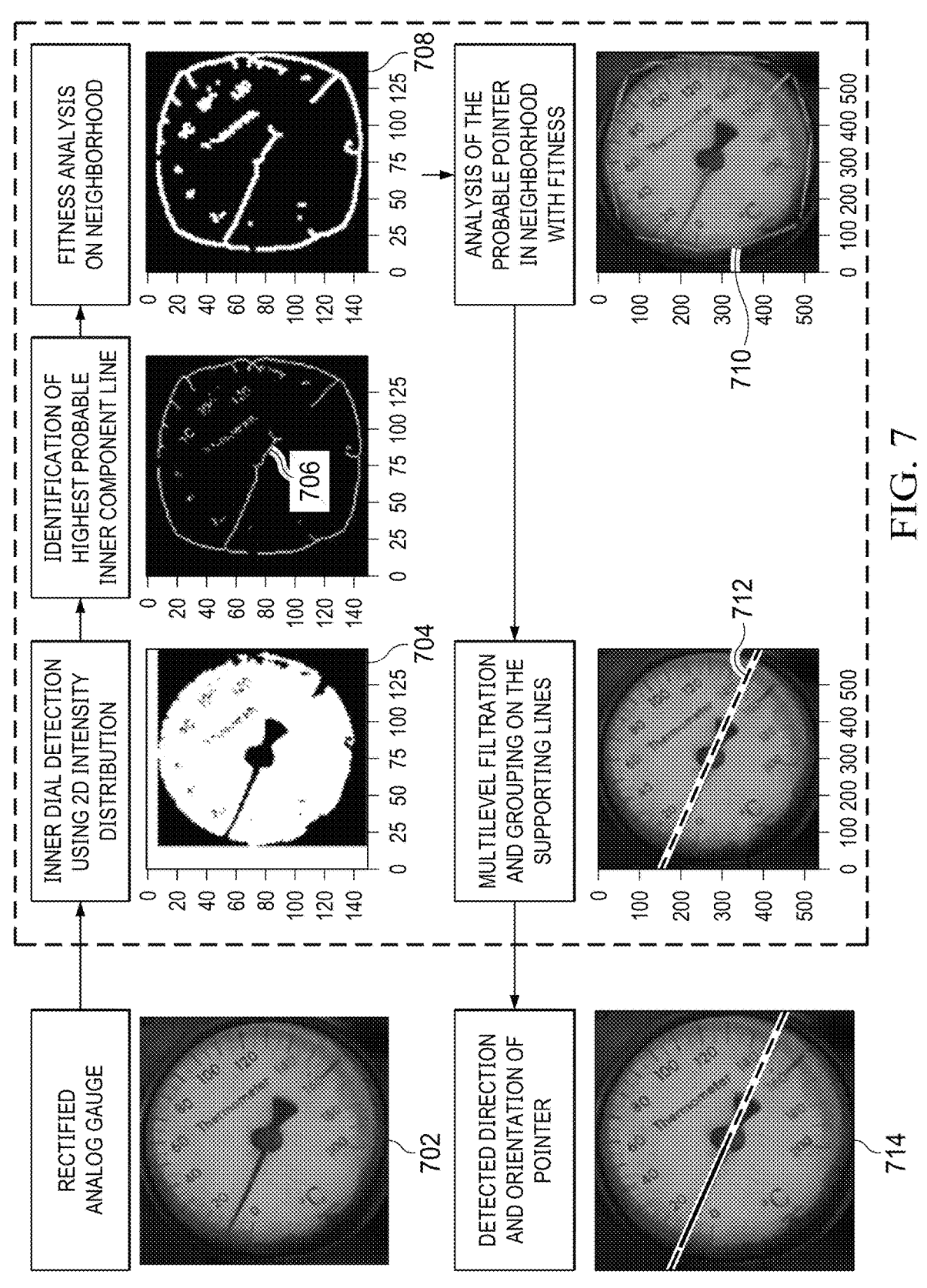
FIG. 7 depicts a pictorial representation of gauge pointer estimation in accordance with an illustrative embodiment.

FIG. 7 depicts a pictorial representation of gauge pointer estimation in accordance with an illustrative embodiment. This process is also illustrated in the flowchart in FIG. 10.

After receiving a rectified image 702 of an analog gauge, the system uses a 2D intensity distribution 704 to detect the inner dial. A highest probably inner component line 706 is then identified. Co-linearity fitness analysis 708 is performed on regions geometrically localized in same neighborhoods, and the system analyzes a probable pointer 710 in a neighborhood with fitness.

Multilevel filtration and grouping 712 is performed on supporting lines which enables detection of the direction and orientation of the gauge pointer 714.

FIG. 8 depicts a flowchart of a process for automated analog gauge reading in accordance with an illustrative embodiment. Process in 800 can be implemented in hardware, software, or both. When implemented in software, the process can take the form of program instructions that is run by one of more processor units located in one or more hardware devices in one or more computer systems. For example, the process can be implemented by automated gauge reading system 202 in FIG. 2.

Process 800 begins by receiving input of an image (step 802).

The system identifies at least one analog gauge in the image (step 804). Detecting the analog gauge in the image may be performed with an object detection model trained to detect analog gauges.

The system corrects the orientation of the analog gauge in the image (step 806). Correcting orientation of the analog gauge in the image may be performed with a rotation classification model trained on images with corresponding orientation information. The system may also correct any perspective distortion of the analog gauge in the image to rectify the analog gauge to a canonical viewpoint (step 808).

The system detects scene text and tick labels on the analog gauge (step 810) and determining the position of a pointer on the analog gauge relative to the scene text (step 812). Detecting the scene text on the analog gauge in the image may be performed with an object detection model trained to detect number regions.

The system computes and outputs a gauge reading value based on an arithmetic progression of tick labels and angle of the pointer with respect to minimum and maximum values on the analog gauge (step 814). Process 800 then ends.

FIG. 9 depicts a flowchart of a process for correcting perspective distortion in accordance with an illustrative embodiment. Process in 900 can be implemented in hardware, software, or both. When implemented in software, the process can take the form of program instructions that is run by one of more processor units located in one or more hardware devices in one or more computer systems. Process 900 may be a detailed example of step 808 in FIG. 8.

Process 900 begins converting the input image to grayscale (step 902) and blurring the image to remove high frequency noise (step 904).

The system identifies candidate ellipse points in the image (step 906) and performing ellipse fitting with the ellipse points according to random sample consensus (RANSAC) (step 908). The ellipse is then affinely transformed to a circle (step 910). Process 900 ends thereafter.

FIG. 10 depicts a flowchart of a process for determining the position of the pointer on the analog gauge in accordance with an illustrative embodiment. Process in 1000 can be implemented in hardware, software, or both. When implemented in software, the process can take the form of program instructions that is run by one of more processor units located in one or more hardware devices in one or more computer systems. Process 1000 may be a detailed example of step 812 in FIG. 8.

Process 1000 begins by performing inner dial detection via dynamic thresholding on an intensity distribution on the image (step 1002) and identifying a highest probability inner component line in the image (step 1004). The system performs co-linearity fitness analysis on regions geometrically localized in same the neighborhoods in the image (step 1006) and analyzes a probable pointer in a neighborhood with fitness (step 1008). The system performs multilevel filtration and grouping on supporting lines in the image to determine the position of the pointer (step 1010). Process 1000 then ends.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of automated analog gauge reading, the method comprising:
   receiving, by a computer system, input of an image;
   detecting, by the computer system, at least one analog gauge in the image;
   correcting, by the computer system, orientation of the at least one analog gauge in the image;
   detecting, by the computer system, scene text and tick labels on the at least one analog gauge;
   determining, by the computer system, a position of a pointer on the at least one analog gauge relative to the scene text; and
   outputting, by the computer system, a gauge reading value based on an arithmetic progression of tick labels and angle of the pointer with respect to minimum and maximum values on the at least one analog gauge.

2. The method of claim 1, further comprising correcting, by the computer system, perspective distortion of the at least one analog gauge in the image to rectify the at least one analog gauge to a canonical viewpoint.

3. The method of claim 2, wherein correcting perspective distortion comprises:
   converting, by the computer system, the input image to grayscale;
   blurring, by the computer system, the image to remove high frequency noise;
   identifying, by the computer system, candidate ellipse points in the image;
   performing, by the computer system, ellipse fitting with the ellipse points according to random sample consensus (RANSAC); and
   affinely transforming, by the computer system, the ellipse to a circle.

4. The method of claim 1, wherein determining the position of the pointer on the at least one analog gauge comprises:
   performing, by the computer system, inner dial detection via dynamic thresholding on an intensity distribution on the image;
   identifying, by the computer system, a highest probability inner component line in the image;
   performing, by the computer system, co-linearity fitness analysis on regions geometrically localized in same neighborhoods in the image;
   analyzing, by the computer system, a probable pointer in a neighborhood with fitness; and
   performing, by the computer system, multilevel filtration and grouping on supporting lines in the image.

5. The method of claim 1, wherein detecting the at least one analog gauge in the image is performed with an object detection model trained to detect analog gauges.

6. The method of claim 1, wherein detecting scene text on the at least one analog gauge in the image is performed with an object detection model trained to detect number regions.

7. The method of claim 1, wherein correcting orientation of the at least one analog gauge in the image is performed with a rotation classification model trained on images with corresponding orientation information.

8. A system for automated analog gauge reading, the system comprising:
   a storage device that stores program instructions; and
   one or more processors operably connected to the storage device and configured to execute the program instructions to cause the system to:
   receive input of an image;
   identify at least one analog gauge in the image;
   correct orientation of the at least one analog gauge in the image;
   detect scene text and tick labels on the at least one analog gauge;
   determine a position of a pointer on the at least one analog gauge relative to the scene text; and
   output a gauge reading value based on an arithmetic progression of tick labels and angle of the pointer with respect to minimum and maximum values on the at least one analog gauge.

9. The system of claim 8, further comprising correcting perspective distortion of the at least one analog gauge in the image to rectify the at least one analog gauge to a canonical viewpoint.

10. The system of claim 9, wherein correcting perspective distortion comprises:

converting the input image to grayscale;

blurring the image to remove high frequency noise;

identifying candidate ellipse points in the image;

performing ellipse fitting with the ellipse points according to random sample consensus (RANSAC); and affinely transforming the ellipse to a circle.

11. The system of claim 8, wherein determining the position of the pointer on the at least one analog gauge comprises:

performing inner dial detection via dynamic thresholding on an intensity distribution on the image;

identifying a highest probability inner component line in the image;

performing co-linearity fitness analysis on regions geometrically localized in same neighborhoods in the image;

analyzing a probable pointer in a neighborhood with fitness; and performing multilevel filtration and grouping on supporting lines in the image.

12. The system of claim 8, wherein:

detecting the analog gauge in the image is performed with an object detection model trained to detect analog gauges; and detecting scene text on the at least one analog gauge in the image is performed with an object detection model trained to detect number regions.

13. The system of claim 8, wherein correcting orientation of the at least one analog gauge in the image is performed with a rotation classification model trained on images with corresponding orientation information.

14. A computer program product for automated analog gauge reading, the computer program product comprising:

a persistent storage medium having program instructions embodied thereon to perform the steps of:

receiving input of an image;

identifying at least one analog gauge in the image;

correcting orientation of the at least one analog gauge in the image;

detecting scene text and tick labels on the at least one analog gauge;

determining a position of a pointer on the at least one analog gauge relative to the scene text; and outputting a gauge reading value based on an arithmetic progression of tick labels and angle of the pointer with respect to minimum and maximum values on the at least one analog gauge.

15. The computer program product of claim 14, further comprising correcting perspective distortion of the at least one analog gauge in the image to rectify the at least one analog gauge to a canonical viewpoint.

16. The computer program product of claim 15, wherein correcting perspective distortion comprises:

converting the input image to grayscale;

blurring the image to remove high frequency noise;

identifying candidate ellipse points in the image;

performing ellipse fitting with the ellipse points according to random sample consensus (RANSAC); and affinely transforming the ellipse to a circle.

17. The computer program product of claim 14, wherein determining the position of the pointer on the at least one analog gauge comprises:

performing inner dial detection via dynamic thresholding on an intensity distribution on the image;

identifying a highest probability inner component line in the image;

performing co-linearity fitness analysis on regions geometrically localized in same neighborhoods in the image;

analyzing a probable pointer in a neighborhood with fitness; and performing multilevel filtration and grouping on supporting lines in the image.

18. The computer program product of claim 14, wherein detecting the at least one analog gauge in the image is performed with an object detection model trained to detect analog gauges.

19. The computer program product of claim 14, wherein detecting scene text on the at least one analog gauge in the image is performed with an object detection model trained to detect number regions.

20. The computer program product of claim 14, wherein correcting orientation of the at least one analog gauge in the image is performed with a rotation classification model trained on images with corresponding orientation information.

* * * * *